(12) United States Patent
Dickhaus

(10) Patent No.: US 6,684,459 B2
(45) Date of Patent: Feb. 3, 2004

(54) HANDLE FOR A TOOL AND A TOOL PROVIDED THEREWITH

(75) Inventor: Reiner Dickhaus, Murnau (DE)

(73) Assignee: Dickhaus & Partner GmbH, Weilheim (DE)

( * ) Notice: Subject to any disclaimer, the term of this patent is extended or adjusted under 35 U.S.C. 154(b) by 0 days.

(21) Appl. No.: 10/220,275

(22) PCT Filed: Mar. 9, 2001

(86) PCT No.: PCT/DE01/00912
§ 371 (c)(1),
(2), (4) Date: Dec. 26, 2002

(87) PCT Pub. No.: WO01/66315
PCT Pub. Date: Sep. 13, 2001

(65) Prior Publication Data
US 2003/0131448 A1 Jul. 17, 2003

(30) Foreign Application Priority Data
Mar. 9, 2000 (DE) .......................... 100 11 106

(51) Int. Cl.$^7$ ................................. B25G 1/04
(52) U.S. Cl. ......................... 16/430; 16/436
(58) Field of Search ............... 16/430, 436, 422; 81/177.1, 177.8, 489; 294/57, 58; 15/144.1, 144.2, 144.3, 143.1

(56) References Cited

U.S. PATENT DOCUMENTS 845,592 A * 2/1907 Stewart ....................... 294/57
3,436,111 A 4/1969 England
4,197,764 A * 4/1980 Auernhammer .............. 74/544
4,704,758 A * 11/1987 Hoffman ..................... 15/144.4
4,962,561 A * 10/1990 Hamilton .................... 15/111
5,060,343 A * 10/1991 Nisenbaum .................. 16/421
5,125,130 A * 6/1992 Stanish ....................... 16/430
5,156,429 A 10/1992 Adams
5,159,769 A * 11/1992 Odorisio ..................... 37/278
5,165,144 A * 11/1992 Nisenbaum .................. 16/421
5,188,340 A 2/1993 Green
5,771,535 A * 6/1998 Blessing ...................... 16/430
5,791,006 A * 8/1998 Anctil ......................... 15/144.4
6,199,245 B1 * 3/2001 Blessing ...................... 16/430
6,237,975 B1 * 5/2001 Drobot ........................ 294/57

FOREIGN PATENT DOCUMENTS

| DE | 3428816 A1 | * | 2/1986 |
| DE | 44 15 974 | | 11/1995 |
| FR | 2 057 100 | | 5/1971 |
| RU | 2097951 C1 | * | 12/1997 |
| WO | WO 89/11213 | * | 11/1989 |

* cited by examiner

Primary Examiner—Chuck Y. Mah
(74) Attorney, Agent, or Firm—Oblon, Spivak, McClelland, Maier & Neustadt, P.C.

(57) ABSTRACT

A handle for a tool. The handle includes a bow-shaped handle end section, a straight middle section, and a fixing end section for attaching the tool. In the handle a S-bow-shaped handle section is arranged between the straight middle section and the fixing end section. The S-bow-shaped handle section is provided with a first, straight handle area connected to the middle section by a first, bent section, and a second, straight handle area connected to the first, straight handle area by a second, bent section. The fixing end section is connected to the second handle area.

21 Claims, 16 Drawing Sheets

HANDLE FOR A TOOL AND A TOOL PROVIDED THEREWITH

BACKGROUND OF THE INVENTION

1. Field of the Invention

The invention relates to a handle for a tool, with a curved handle end section, a straight middle section and a fixing end section for attaching the tool, as well as an apparatus comprising such a handle.

2. Description of Related Art

A handle of this generic kind and a tool equipped with such a handle are disclosed, for example, in the patent DE 4415974 A1. The known apparatus is disadvantageous inasmuch as the movements possible while shoveling are limited. It has a high, forward-tilted handle grip, with the result that after a load has been taken onto the tool and lifted, it is difficult to tip the load off to one side by turning the handle, a maneuver customary and possible with the known handle-equipped tools. The higher the front grip area, the more difficult such a rotation is. Only at the minimum-gravity point of the throwing-off movement is rotation by means of a high front grip area possible. Hence a manipulation involving a swinging movement is needed, which requires more working space.

The known apparatus with high, tilted handle grip is also disadvantageous when the shoveling work is carried out above knee height. Then the handle must be lifted to shoulder height in order to push the blade of the shovel into the material to be loaded. With the body in this unfavorable posture the load must then be raised and accelerated in order to throw it off.

When the shoveling work is above hip height, however, it is also difficult to work with conventional long-handled shovels, because the long handle can be manipulated only near its front end. Therefore in this case a shovel with shorter handle or a spade is often used.

If work in a kneeling position is necessary, it is customary to use a hand tool such as a gardener's or mason's trowel or the like. Because the hand is relatively weak, not as much force is available as is provided by the lever action of the large handles. Furthermore, small hand tools cannot reach as far, nor can forces be contributed by the feet and shoulders.

BRIEF SUMMARY OF THE INVENTION

The invention has as its objective to create a tool handle that is ergonomically improved.

This objective is achieved in accordance with the invention by a handle according to claim 1 and claim 16. Advantageous further developments of the invention are disclosed in the subordinate claims.

The invention is based on the realization that ergonomic demands that are actually opposed to one another can be satisfied with a single device only if the grip areas at the front of the handle are arranged in several or at least two steps.

The invention further relates to an apparatus comprising a tool plus a handle in accordance with the invention.

It can be provided here that the handle is attached to a tool in an off-center position.

With respect to handling and mode of operation, the forms of apparatus in accordance with the invention to some extent resemble known hand tools such as shovels, spades, forks, hoes etc. However, the work accomplished with the known tools can be done more easily and/or with less expenditure of force when the apparatus in accordance with the invention is used, because the physical forces exerted by hands, feet, thighs, shoulders etc. on the tool can be applied in an ergonomically more favorable way at the points specifically configured for the purpose.

Apart from the fact that work with the novel devices both saves work and spares the back, the risk of blistering the hands is diminished because the forces involved are oriented transverse to the closed hands and moreover are transferred into the hand transversely.

Injuries caused by the handle end penetrating the body, as happens with conventional handle-operated devices, are avoided by the configuration of the back handle regions. The elasticity of the material, in combination with the S-shaped configuration of the front, curved handle regions of the apparatus in accordance with the invention, enable impacts acting in various directions to be cushioned; in combination with the large-area structure of the regions to which force is applied in the apparatus in accordance with the invention, this elasticity prevents internal injury to the contacted parts of the body.

The operating functions resemble those of previously known devices, but in each case the apparatus in accordance with the invention can be employed in more ways; this multifunctionality is enabled by the S-shaped basic form. The apparatus in accordance with the invention, equipped with a stable shovel-type scoop or blade, can therefore be used in place of the previous long-handled shovel, the previous spade, the ice scraper and the hoe, with ergonomic benefits; in addition, it can be operated as a trowel, with one hand/arm.

Power tools that were previously operated by hand, such as hedge trimmers, can by this means be employed in an ergonomically better way and hence with less physical force. The multifunctionality also makes it possible to use the hedge trimmer, for instance, to cut off dried shrubs near the ground without bending and to trim quite high hedges without a ladder.

It is advantageous that the space needed to work with the apparatus in accordance with the invention is equivalent to only the space required for a short shovel or a spade, whereas in some cases the present apparatus can move a given weight further than can a conventional long-handled shovel, while imposing less load on the operator's spine. In any case, the force with which it can penetrate into the material to be carried is sometimes several-fold greater, with less physical effort, than when conventional devices are used.

In contrast to the known embodiments, the arrangement of grip areas in accordance with the invention is such that in the front handle region they are disposed at different heights, one over another, with a straight handle part extending diagonally upward. These grip areas, designed in relation to the dimensions of the human body, make possible an extra degree of multifunctionality, in addition to the possibilities provided by the device in accordance with the invention for work in a standing position, in that the material to be carried can be manipulated in different directions and at different heights.

The previously conflicting ergonomic demands faced by a person working in a standing position have been described in detail for the case in which the work region (e.g., the material to be moved) is at different heights. On the whole, the ergonomic demands encountered when a person is working in standing, kneeling and even sitting positions are similarly conflicting. The grip-lever arrangement in accordance with the invention, designed in relation to body dimensions, is proportioned such that even these kinds of work can all be done with a single device.

BRIEF DESCRIPTION OF THE SEVERAL VIEWS OF THE DRAWINGS

In the following the invention is explained in detail by describing several exemplary embodiments, in each case with reference to a drawing, wherein

FIG. 26 is a representation in perspective of the manipulation of a seventh exemplary embodiment of the apparatus in accordance with the invention, with the power tool for trimming hedges as tool part (2), which for trimming the top of a hedge has been rotated by 90° in comparison to FIG. 25a.

DETAILED DESCRIPTION OF THE INVENTION

Figure 1:
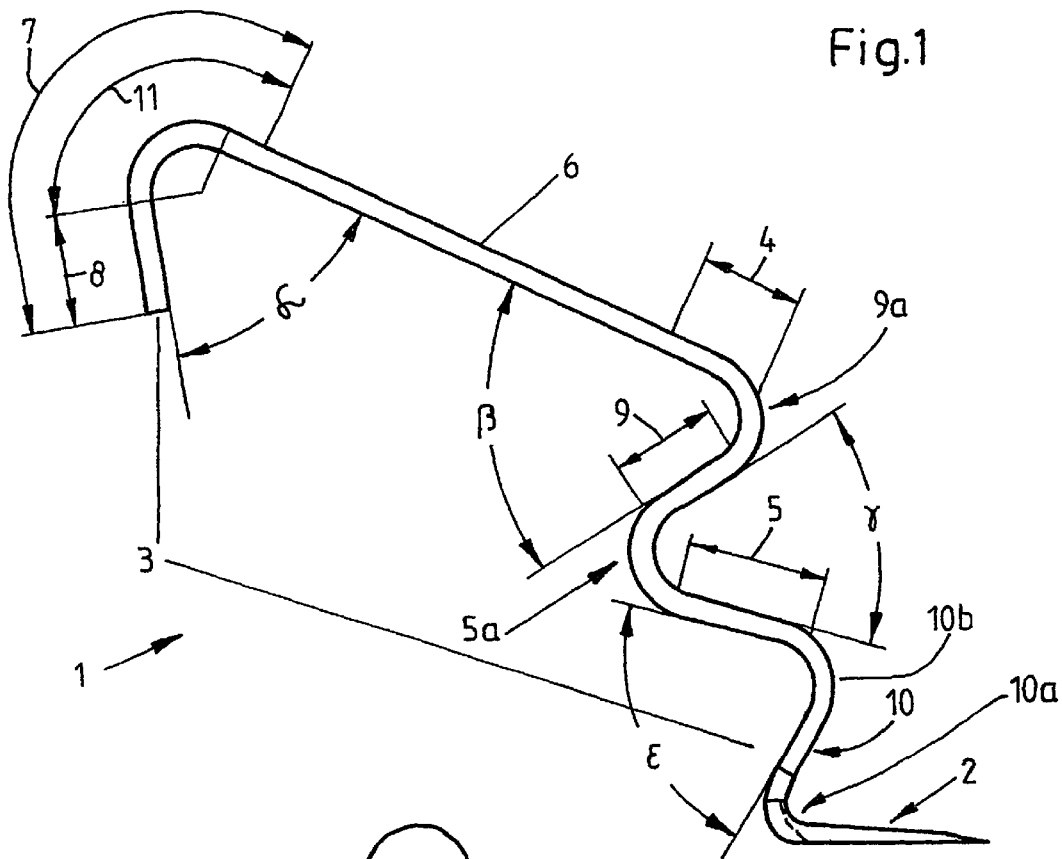
FIG. 1 represents a first exemplary embodiment of the apparatus in accordance with the invention, equipped with a spade blade, in the vertical operating position as seen from the side.

In FIG. 1 a handle in accordance with the invention is shown from the side; it is equipped with a spade blade 2. The drawing identifies its subdivisions: the middle section 6, the curved regions 11, 9a, 5a, 10b, the straight grip areas 8, 9, 5 and the tread area 10. The areas 8, 9, 5 and 10 can lie in a single plane, as shown in FIG. 1, but they can also be at an angle to the plane of the drawing, in which case the angular dimensions given in FIG. 1 correspond to the projection onto the plane of the drawing.

Figure 2:
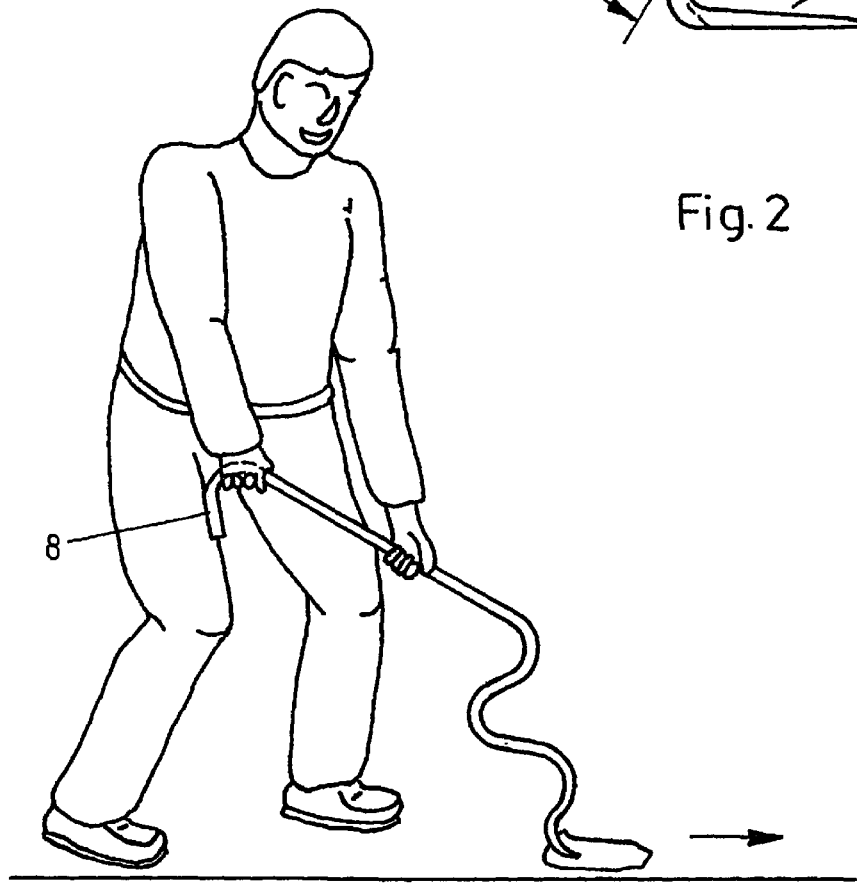
FIG. 2 is a representation in perspective of the manipulation of the first exemplary embodiment in the vertical operating position, in which an operator is inserting the apparatus into the load material by pressing his thigh against grip area (8).
Figure 3:
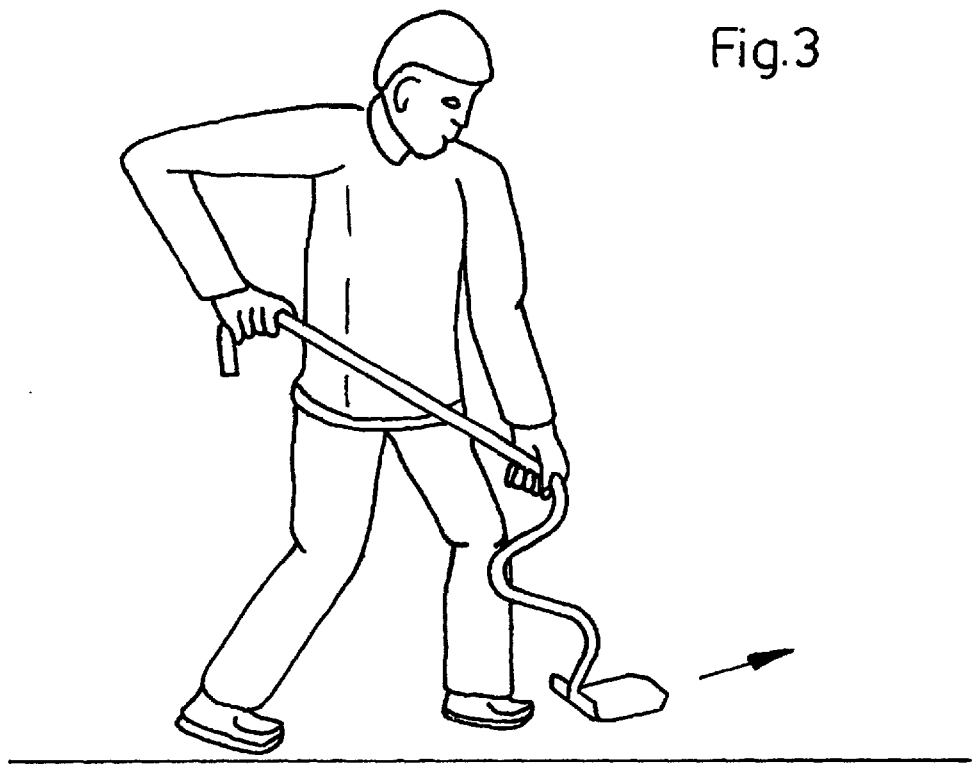
FIG. 3 is a representation in perspective of the manipulation of the first exemplary embodiment of the apparatus in accordance with the invention in an initial operating position, in which an operator is pushing the apparatus forward by holding it in the grip areas (4, 11) after it has been loaded at ground level.
Figure 4:
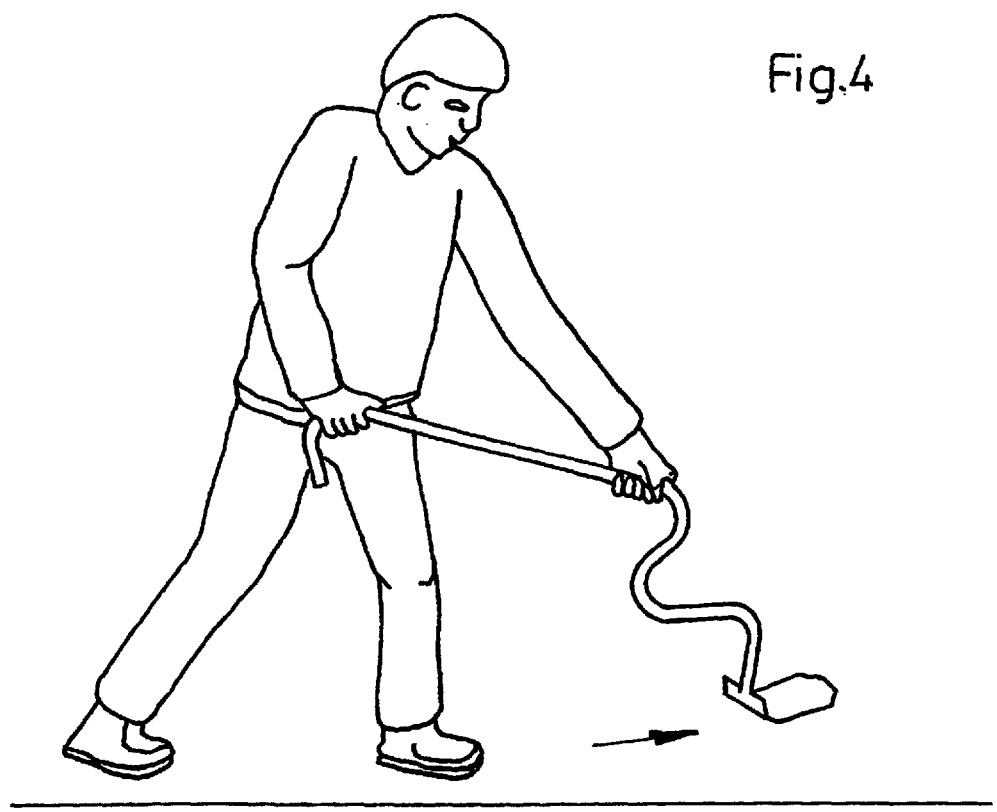
FIG. 4 is a representation in perspective of the manipulation of the first exemplary embodiment of the apparatus in accordance with the invention in an operating position in which the accelerated load is being thrown forward and down.
Figure 5:
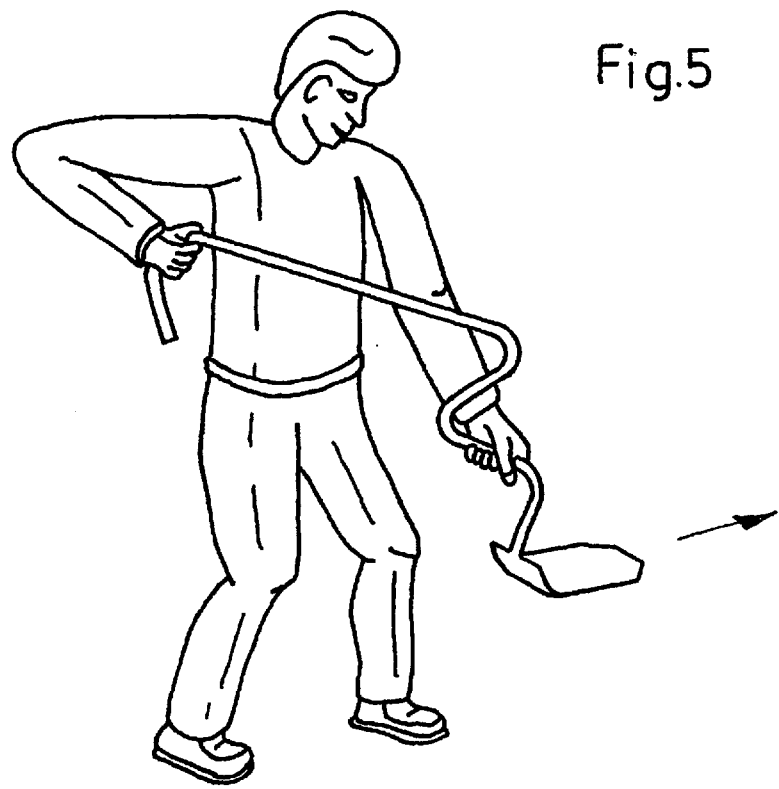
FIG. 5 is a representation in perspective of the manipulation of the first exemplary embodiment of the apparatus in accordance with the invention in an operating position during shoveling, namely the initial position, in which an operator is inserting the apparatus into load material that is above knee height, or has taken up a load and is pushing it forward.
Figure 6:
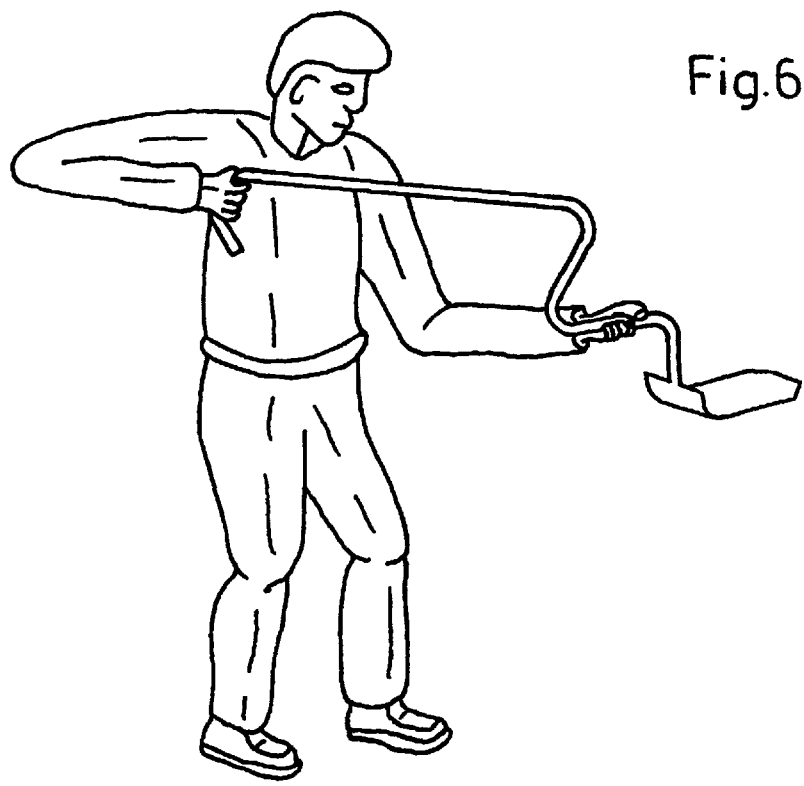
FIG. 6 is a representation in perspective of the manipulation of the first exemplary embodiment of the apparatus in accordance with the invention in an operating position such that the operator is holding the apparatus in the initial position, in which the apparatus is being inserted into the load material. Here the load material is at hip height.

In the apparatus in accordance with the invention, represented in FIG. 2 as it appears when used for shoveling, i.e. in a horizontal position, the back end of the handle has a rounded, large-area configuration. The downward curvature is known but not the straight grip part, which is tilted somewhat forward and elongated so that its length exceeds the width of a hand. When the tool is being advanced in a pushing or striking movement with force applied by the upper thigh, this grip area 8 enables the force to be introduced at the lowest possible contact point, so that the load material is penetrated at a favorably shallow angle. Because of the large area of the contact surface at the end of the handle, as well as the impact-damping property of the grip part, injuries to the body are avoided. By back-and-forth movements of the front hand, penetration into and loosening of the material can be still further assisted.

For taking up the load material, the long straight handle part 6 can be slid forward through the hand, while the back elbow, having previously been bent, pushes the apparatus forward into the material by extending the arm at the back grip area. During the process of advancing the apparatus into the load material, the front arm can carry out the movement synchronously. When the load has been taken onto the shovel, prior to acceleration the apparatus is pulled backward into the initial position near the body. During the movement into this initial position, the apparatus is raised with upper body almost upright. In this initial position, with nearly upright upper body, the front arm is extended downward and bears the entire weight of the apparatus with its load. The back, bent elbow does not need to balance out any load in this initial position. The acceleration force produced by extending the previously bent arm is almost on a line from the load to be accelerated to the back end of the handle, because of the long straight part of the handle that slants upward. When the apparatus is pushed forward, the long straight handle part 6 can slide forward through the hand so that the handle is guided; or else the front arm guides the movement synchronously, in which case the shoulder joint forms the axis of rotation for the movement. This manipulation is made possible by the well-proportioned arrangement of the front grip areas 4, 5 and 9 of the handle and the arm-long handle region 6.

In the case of conventional handles the device must be accelerated from the back with bent or rotated wrist, by way of frictional forces that are limited by the strength of the hand. In addition, the back arm must also guide the load on the shovel by using the end of the handle as counter-lever. The loads or forces that must be managed with both arms, far away from the body, place severe demands on the back, arms and hands during the course of the movement. With the apparatus in accordance with the invention this is not the case. The manipulation with the apparatus in accordance with the invention is less strenuous; lower bodily forces must be exerted for a given weight of load material. The vertebral column with its ligament and muscle components is also less severely stressed, because the operating movement is carried out more with the relatively powerful muscles of arms and legs—e.g., to penetrate the load material, the force is generated almost entirely by the thigh (FIG. 2).

The prior-art hand-operated devices are unsuitable for women and the progressively aging fraction of the population, because of the force exertion they require. But even for the younger generation, which increasingly suffers from back problems and damage to the spine, a device that both saves effort and spares the back is better. It is advantageous that this back-sparing work is not only possible (as is also true to some extent for conventional devices, if proper training is given), but tends more to come naturally on account of the various gripping possibilities (the instruction is integrated, so to speak).

Furthermore, less stress is placed on the hands, because the body forces need not be transmitted by frictional forces associated with the hands, as is customary in the prior-art hand-operated devices.

It is advantageous that the sequence of movements used to guide the apparatus in accordance with the invention, in spite of the unusual configuration of the grip areas, resembles the movements to which an untrained user is accustomed when the device is used for the known purposes such as shoveling.

For example, when the apparatus is used as a spade, the contact area 10 on the handle near the tool blade 2 is available to be engaged by the foot from behind, serving as a tread 10 on which the foot can step with the full body weight as though on the tread of a staircase. As seen from the side, the tread 10 is part of the lowest handle region, i.e. of the front, S-shaped handle region that slants forward over the tool blade and merges therewith. Because force is applied in the middle, the tool is prevented from rotating or slipping out to the side. The tread area 10 on the guide part 3 of the handle can be pressed by the foot equally well from the side or from the back.

Figure 9:
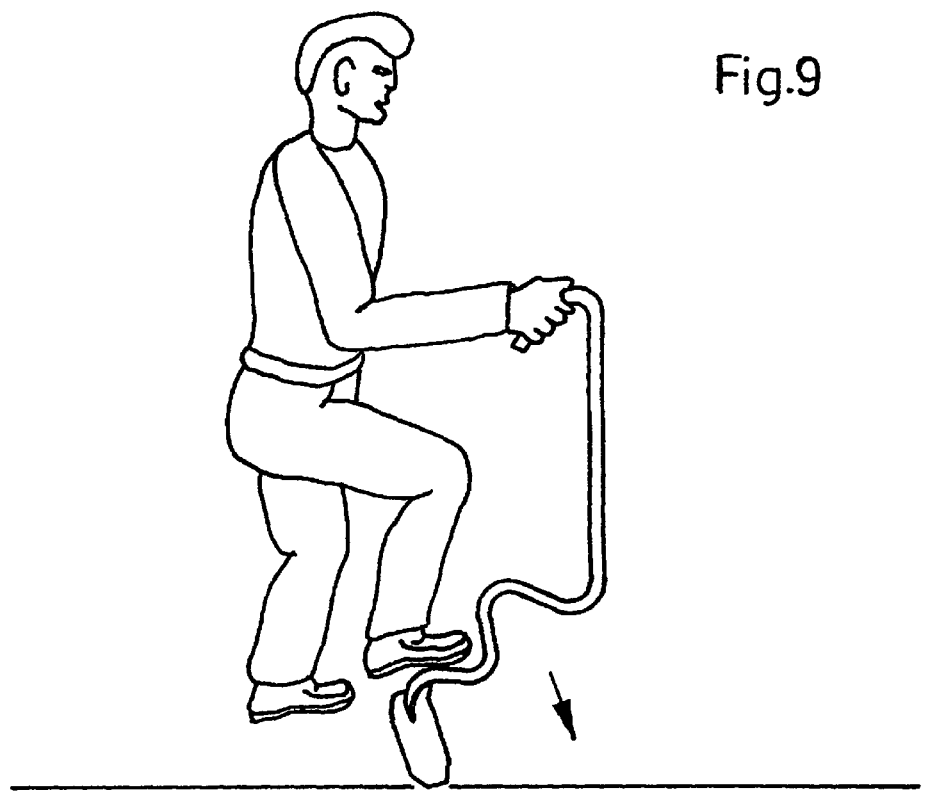
FIG. 9 is a representation in perspective of the manipulation of the first exemplary embodiment in an operating position such that a tool part of the apparatus in accordance with the invention is being pushed into the ground by an operator.
Figure 10:
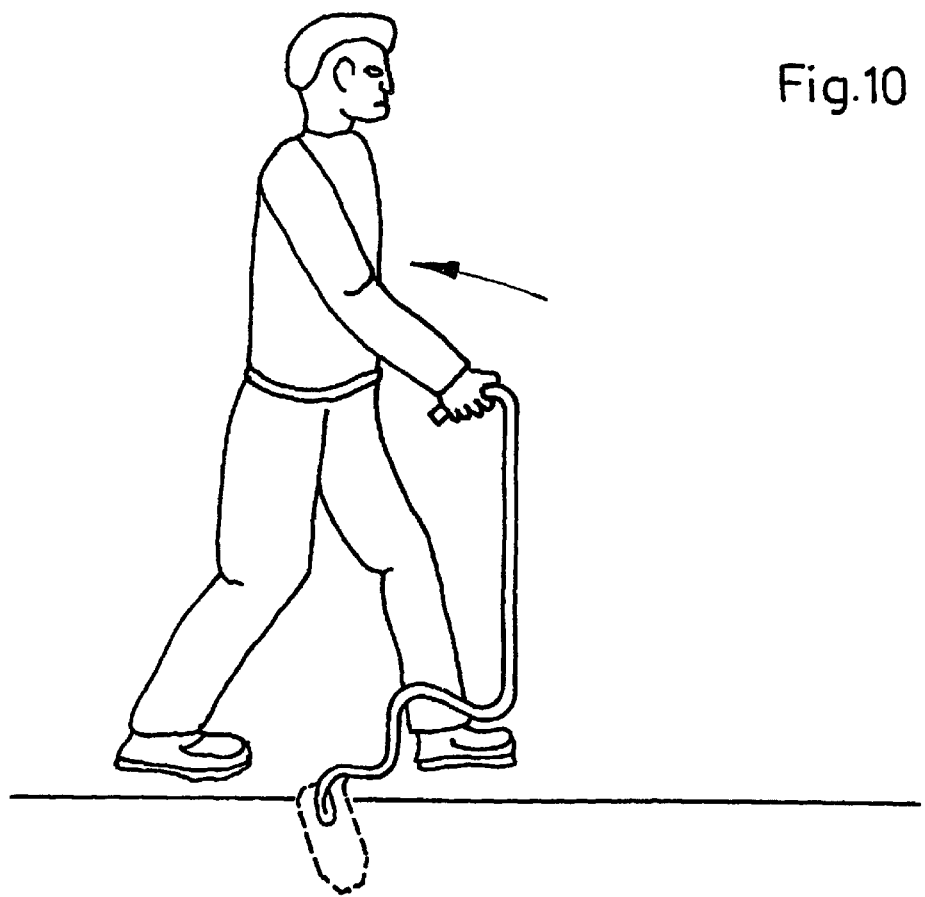
FIG. 10 is a representation in perspective of the manipulation of the first exemplary embodiment in an operating position such that a tool part of the apparatus in accordance with the invention, having been pushed into the ground, is being levered backward by an operator.

In the back handle region 7 (FIG. 1), disposed at the height of the normal spade-handle ends, the straight, more than hand-wide grip area is positioned in such a way that when the foot steps onto the tread from behind, the handle end slants downward like the the handrail of a staircase, almost at a right angle to the forearm (FIGS. 9, 10).

In the case of handles in accordance with the invention that are equipped with a fork tool, this grip arrangement is so proportioned that someone using two such devices like stilts can climb up an inclined surface.

Figure 8:
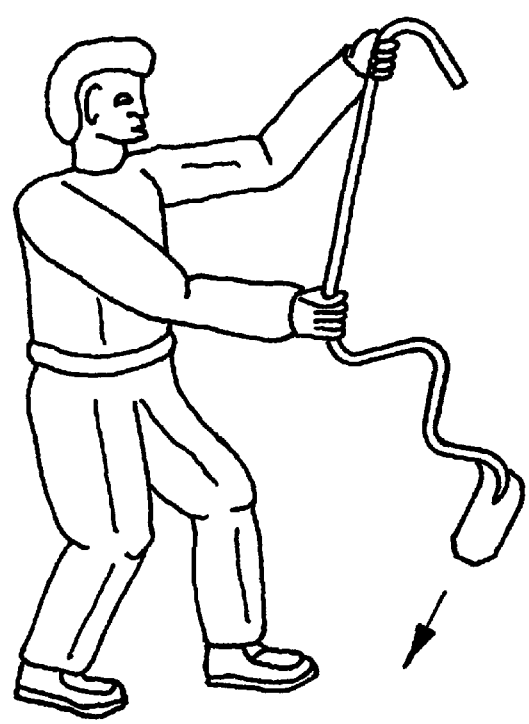
FIG. 8 is a representation in perspective of the manipulation of the first exemplary embodiment of the apparatus in accordance with the invention in an operating position during spade work. The spade is held in a vertical operating position and struck into the ground like a hoe.

The arrangement of the back handle end with the large-area configuration facilitates vertical insertion during use as a spade, when the tool is swung downward by someone standing behind or next to the device (FIG. 8). The grip area is disposed almost transverse to the direction of travel, so that when the tool blade enters the substrate, the grip area does not slip out of the hand (FIGS. 9, 10). When the tool is to be rotated, furthermore, the arrangement of the back end of the handle provides a lever for applying the associated force that is longer than in the devices described above.

The device is also advantageous for levering boards apart, for instance those of a Euro-Transport pallet or ceiling panelling, instead of using a "jimmy" or crowbar.

Another advantageous feature is the small space needed for movement in order to apply force to the cutting edge of a tool. When digging a small pit with vertical walls, which has a diameter corresponding to the length of the spade blade but is twice as deep as its diameter, the device in accordance with the invention can be optimally employed; otherwise, it would be necessary to use a two-bladed device such as a posthole digger ("scissors spade"). By employing the body forces in combination, with the device in accordance with the invention it is even possible to dig in stony, hard ground, where otherwise a crowbar would have to assist the shoveling work because the "scissors spade" no longer suffices. During digging almost the entire body weight is applied to the tread area in the middle, as when stepping on a stair tread. Just as one can climb stairs barefoot, the large-area configuration of the tread surface actually allows barefoot use of the digging device. Penetration is further assisted when the handle, serving as a lever, is swung back and forth while the user is stepping on the tread (FIG. 10), to loosen the substrate; this action can also be reinforced by rotational movements of the apparatus.

After the tool has been inserted and the handle levered back and forth, the loosened load material (soil) can be lifted out of the soil by a paddle movement, with the tool blade almost horizontal, while the operator is kneeling or sitting on the edge of the ditch. Here, again, the front grip areas arranged at the various heights are extremely advantageous.

Another advantage is that during this kind of work the "digging device" can be used as a support, like a walking stick, while changing between the kneeling and standing positions.

Figure 7:
FIG. 7 is a representation in perspective of the manipulation of the first exemplary embodiment of the apparatus in accordance with the invention in an operating position such that the operator is using the apparatus to remove the load material from a container. The load material is situated above knee height.

It is likewise advantageous that the devices in accordance with the invention avoid the risk of injury presented by conventional devices when, in situations such as removing mortar from a wheelbarrow with a shovel, the front hand becomes caught between tool and container (FIG. 7). While digging a small pit as described above, there can be a similar problem if the front hand slips while inserting or levering the tool. With the devices in accordance with the invention, in which the front handle region is constructed with an S-shaped curvature, the places where the hands grasp the handle are distant from the danger zone (FIG. 7).

The conventional hand-operated devices do not fulfill the mutually incompatible demands imposed by snow, namely to optimally shovel it as well as push it out of the way. To act as a snowplow a tool should have a large blade that is pushed while its surface is almost perpendicular to the snow layer. The steeply inclined position of the surface of the tool blade with handle that is necessary for pushing snow is not favorable for shoveling. For this device to be used as a shovel, the surface of the tool must be inserted under the snow at a shallow angle and then raised. This work cannot be performed without bending the body far over, particularly when it comes to the lifting process. The great weight of wet snow increases the stress imposed on the body by this unfavorable position. An asymmetrical distribution of the load material, with a resulting undesired rotation of the tool, cannot be compensated with gloves in the case of many grip designs.

The variable nature of snow—firmly packed, frozen to the substrate, etc.—in itself makes excessive demands on the customary devices used for pushing snow. To apply the necessary forward pressure on the edge of the shovel and in addition generate enough force for forward propulsion is possible only with the body bent forward at an angle, and is therefore strenuous work that can damage the back.

Often, therefore, in this case the shovel scoop is pushed forward with the foot. Under this asymmetric force application, rotation about the handle axis must be prevented, which is especially difficult when the handle is smooth or covered with ice. In just the same way, rotation caused by an asymmetrical distribution of the load material is difficult to prevent.

Apart from the differences in the characteristics of snow, the surface from which it is to be removed can also vary in structure; on smooth asphalt, snow that has been packed down can be scraped off, whereas when the snow is lying on gravel surfaces, the tool blade must slide along above the gravel so as not to remove it as well.

The work of snow shoveling is composed of several different steps. First the snow is pushed onto the scoop of the tool. Then the operator brings his body as close as possible to the heavy load on the broad tool scoop, in order to lift and accelerate the load from this position. With the previously known scoops it is possible to work only with upper body bent forward and positioned at the side of the handle; or else the load is accelerated ahead of the front leg, with an unfavorably short lever action.

Even with angled levers included in the designs described in the patent documents, only part of the work can be done with the body in a position that does not strain the back. In this case, however, rotation by asymmetrically loaded material is impossible.

In order to work with a body movement that is easy on the back, with the body in the initial position described above the raised shovel scoop must accelerate from close to the body away to the side for the throwing movement. The raised shovel scoop, held in front of the body, must therefore be suspended over the front foot, and the back edge or corner must be prevented from striking the shin. The width of the back of the scoop from the point 10, where it joins the handle, to the corner may not be longer than the distance from the toe of the shoe to the shin, if the device is to be moved close to the body both right- and left-handed, i.e. on the right and left sides, in an ergonomically favorable manner.

Figure 11:
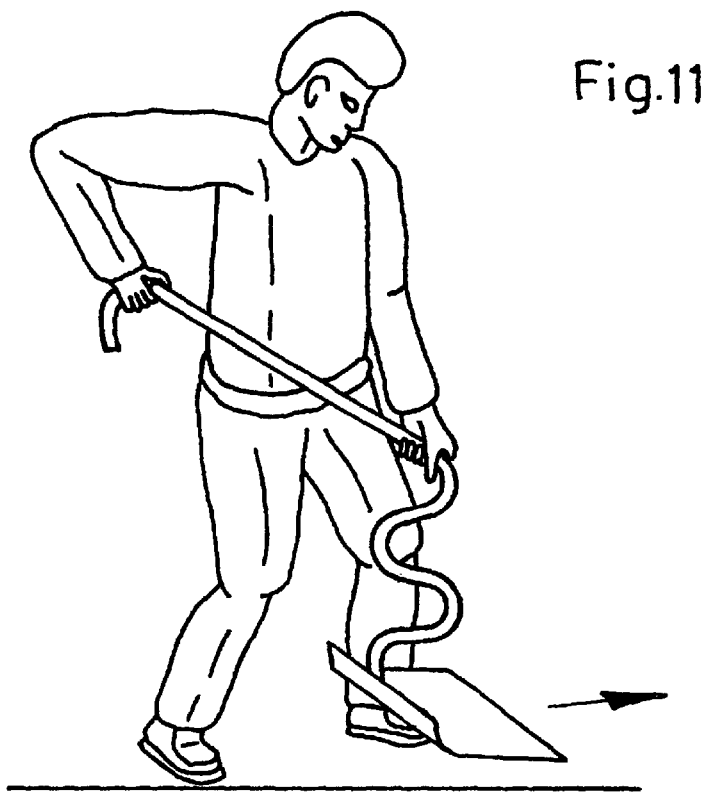
FIG. 11 is a representation in perspective of the manipulation of a second exemplary embodiment of the apparatus in accordance with the invention, which is equipped with a large shovel scoop, in the operating position in which an operator is pushing the apparatus, including a load that has been taken up at ground level, forward by holding the grip areas (4, 11).
Figure 12:
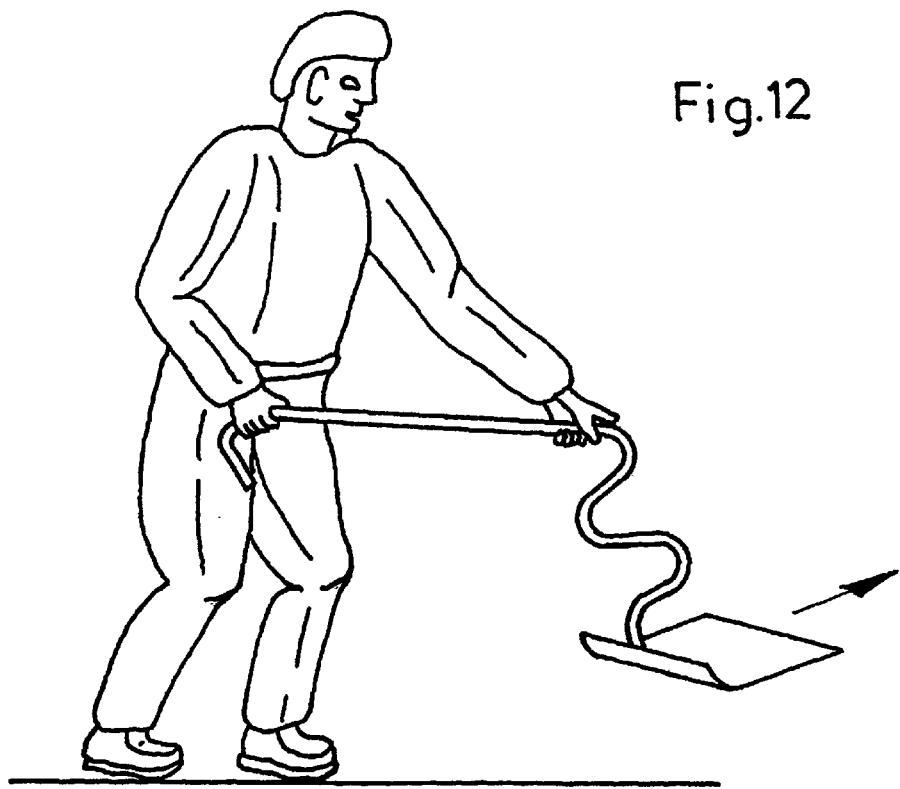
FIG. 12 is a representation in perspective of the manipulation of a second exemplary embodiment of the apparatus in accordance with the invention, which is equipped with a large shovel scoop, in the operating position in which an operator, holding the grip areas (4, 11), has pushed the apparatus with its load forward, and the accelerated load is falling forward and down from the tool part.
Figure 13:
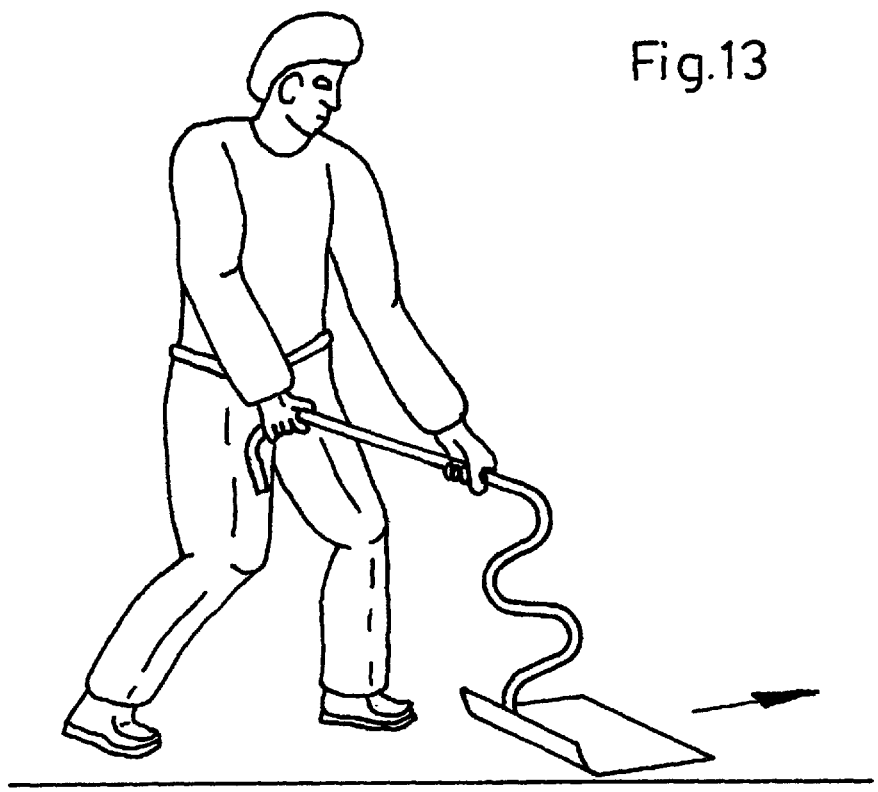
FIG. 13 is a representation in perspective of the manipulation of a second exemplary embodiment in vertical operating position, in which an operator is pressing the apparatus into the load material by pressing his thigh against grip area (8).
Figure 14:
FIG. 14 is a representation in perspective of the manipulation of a second exemplary embodiment of the apparatus in accordance with the invention, which has a scoop for displacing or shoveling snow as tool part (2) and is shown in a vertical operating position while pulling the load toward the operator.
Figure 15:
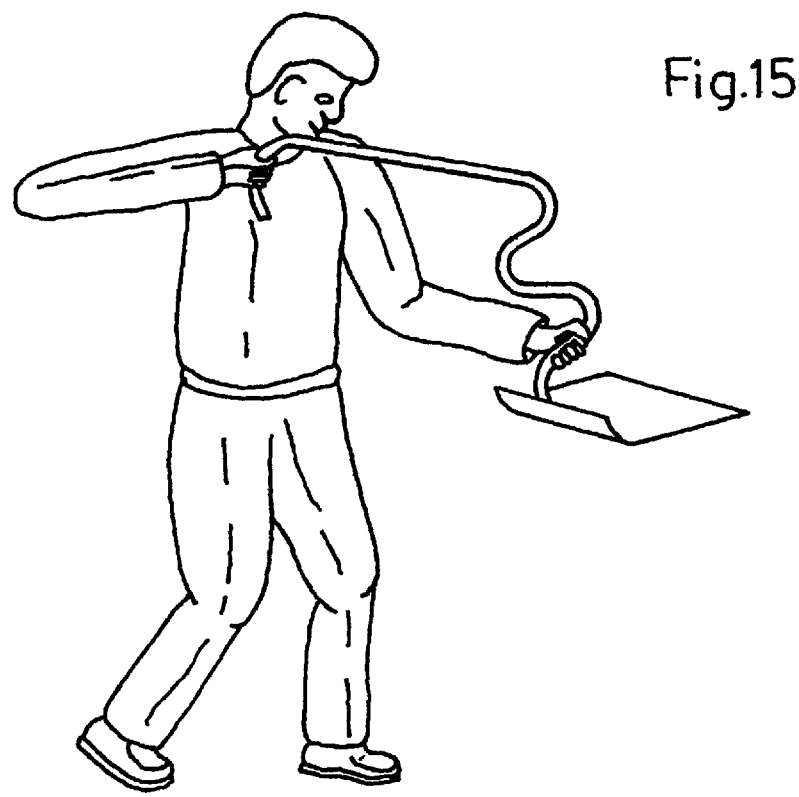
FIG. 15 is a representation in perspective of the manipulation of a second exemplary embodiment of the apparatus in accordance with the invention with a snow scoop as tool part (2), in an operating position in which the operator is accelerating a load that has been taken up above hip height.

The handle-lever arrangement in accordance with the invention with a large shovel scoop, configured as detailed above, makes it possible to accelerate large, heavy loads while keeping the upper body upright (FIGS. 11, 12).

The apparatus in accordance with the invention, with the grip areas in the front S-shaped region arranged stepwise and the top front grip area above "knee height", enables the force imposed by the foot to be centrally positioned, even when the tool is being pushed forward as a snowplow or to shovel snow. The S-shaped handle provides large counter-leverage against rotation about the longitudinal and vertical axes, if one side of the rapidly moving tool should strike against an unexpected obstacle.

Furthermore, many aspects of the embodiments described also apply to the digging tool in accordance with the invention.

The handle-lever arrangement in accordance with the invention is so configured that forces about the axis of rotation can be overcome in a manner that saves effort and spares the hands. The load and force levers for guiding and/or controlling the rotational movement are so well proportioned that, e.g., snow carried on the raised tool can be cast away from the body by a rotation in the standing position; to do this, the raised scoop carrying the load is tilted by means of the back angle-lever 8 (FIG. 16) while the front hand guides the axis of rotation. The leverage situation is still more favorable when the front hand functions as axis of rotation at the lowest level of a two-step embodiment in accordance with the invention.

It is still easier to perform the body movement for unloading the apparatus in accordance with the invention with snow-scoop held close to the body and the tool rotated over the front shoulder. For this purpose, while the load is being raised, the extended arm is bent with the elbow as axis of rotation, so that the shovel rotates along with it.

Figure 16:
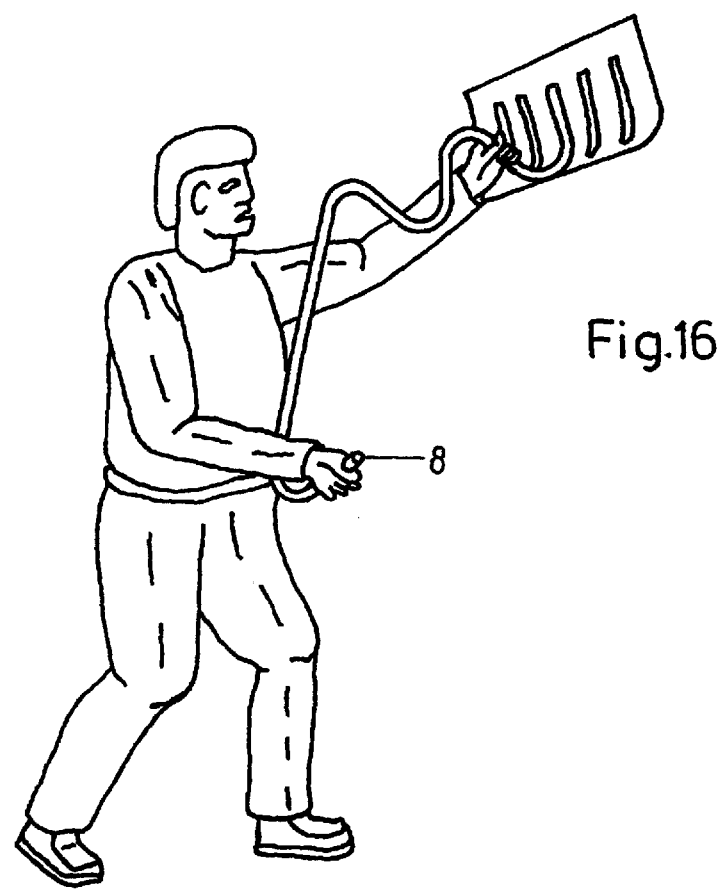
FIG. 16 is a representation in perspective of the manipulation of a second exemplary embodiment of the apparatus in accordance with the invention with a snow scoop as tool part (2), in an operating position in which the operator, after accelerating the load with the apparatus, is tipping the load out by grasping the apparatus at the back end grip (8) and rotating it.

The grip areas arranged stepwise in the front S-shaped region are positioned at heights such that the body's axes of rotation at the elbow and the shoulder can be employed without the handle getting in the way; see FIG. 16.

The tread area 10 on the guide handle 3 is usually connected to the tool part in the middle of the latter; this allows an operator to work equally well on either side, and either left- or right-handed. So that an especially large snowplow blade can be used while still manipulating the tool in an ergonomically favorable manner, the blade is asymmetrically broadened away from the body. However, to avoid twisting caused by too great an asymmetry in the distribution of the loaded material, a supplementary lever 11 is disposed in the front S-shaped region, extending away from the body to the side.

Figure 17:
FIG. 17 is a representation in perspective of the manipulation of a third exemplary embodiment of the apparatus in accordance with the invention, which has as tool part (2) a shovel scoop attached asymmetrically to the handle (3), shown in a vertical working position in which the apparatus is being pulled along the ground in order to pull the load. The operator, standing upright and holding onto a supplementary grip (11), moves the apparatus in a shoveling mode in front of the body and off to the side.
Figure 18:
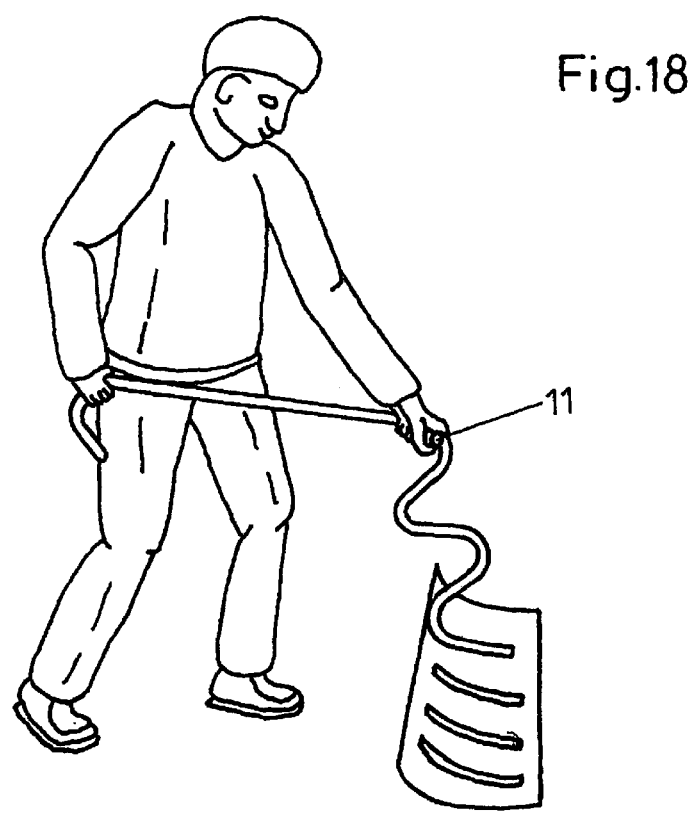
FIG. 18 is a representation in perspective of the manipulation of a third exemplary embodiment of the apparatus in accordance with the invention, which has as tool part (2) a shovel scoop attached asymmetrically to the handle (3), shown in a vertical working position during acceleration of the apparatus in a shoveling mode, to throw the load to one side.

This supplementary grip area 11 can be welded on or else displaceably connected to the S-shaped section of the handle 3 of the apparatus in accordance with claim 1. An advantage of this embodiment of the apparatus is that a surface such as a sidewalk about 2 m wide can be cleared in an extremely short time, by moving the snow to the side (FIGS. 17, 18).

The tool part 2 attached to the handle 3 in accordance with the invention can also consist of a broom for sweeping the surface. To facilitate the sweeping movement, the handle is not perpendicular to the broom part but rather is slanted towards the body, so that an asymmetric broom part is not needed.

With a digging tool in accordance with the invention that has a set of prongs as tool part 2, work can be carried out that would otherwise necessitate several different tools. A tool having the novel handle configuration and equipped with three prongs can be manipulated for work in areas associated with prior-art devices such as the hand-operated rake or hoe, pitchfork and long-handled revolving fork. Prior-art revolving forks have a handle arrangement which, in combination with the configuration of the tool prongs, makes them unsuitable to function as a rake for collecting materials, such as fallen leaves, or as a fork for distributing or lifting up materials.

With prior-art hoes and rakes, bending the body forward is unavoidable. Curved and stepped handles can be provided to enable a more upright posture while working, but because the operator's force has to be applied too far away in front of the body, this makes the lever arms too short. As a result, the disadvantages described above are incurred.

Figure 19:
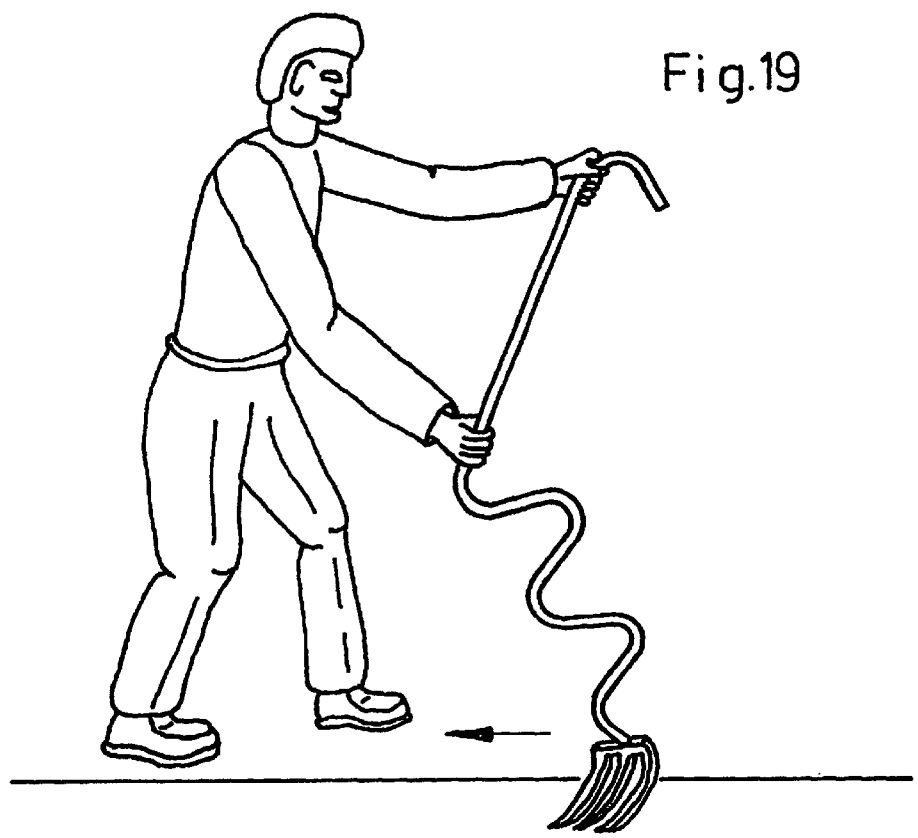
FIG. 19 is a representation in perspective of the manipulation of a fourth exemplary embodiment of the apparatus in accordance with the invention, which has as tool part (2) a fork with which the operator, while standing upright, pulls the vertically oriented apparatus along in order to rake the ground.
Figure 20:
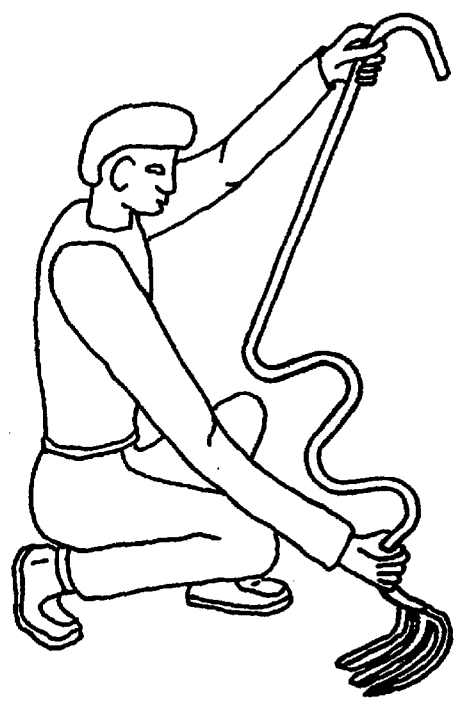
FIG. 20 is a representation in perspective of the manipulation of a fourth exemplary embodiment of the apparatus in accordance with the invention with a fork as tool part (2), shown with the apparatus in a vertical working position to be pulled along for raking the ground; the operator is in a kneeling position.

When the apparatus in accordance with the invention is used for work that mainly involves hoeing and raking movements, there is no need to change the basic shape of the guide handle 3, but the gripping and movement regions are adapted to the intended function of the tool. The orientation of the handle is vertical, as for a spade, but rotated by 180°. Then what was formerly the "back" grip area is in front, when the operator is in the initial position with slightly bent elbows, and is held almost directly above the tool part 2. With the back arm the former "front curved handle region" is pulled backward (FIGS. 19, 20).

With a novel "rake/shovel blade" it is possible first to pull the leaves or grass together into a heap, and then to use the tool like a shovel for loading the material into a wheelbarrow, by tilting the tool so that the handle in accordance with the invention is differently oriented and is grasped in different places by the hands. This tilting and re-grasping action is carried out in the plane of the main directions of force, when the load is to be transported further to the side.

Figure 21:
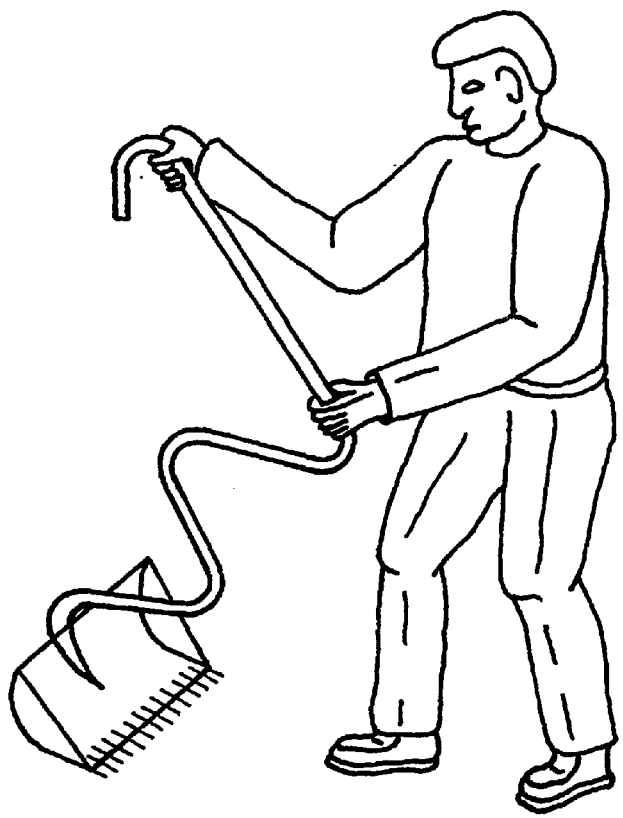
FIG. 21 is a representation in perspective of the manipulation of a fifth exemplary embodiment of the apparatus in accordance with the invention, with a rake-and-scoop tool part (2), in a vertical operating position to be pulled along for gathering together, e.g., leaves while the operator is standing upright.
Figure 22:
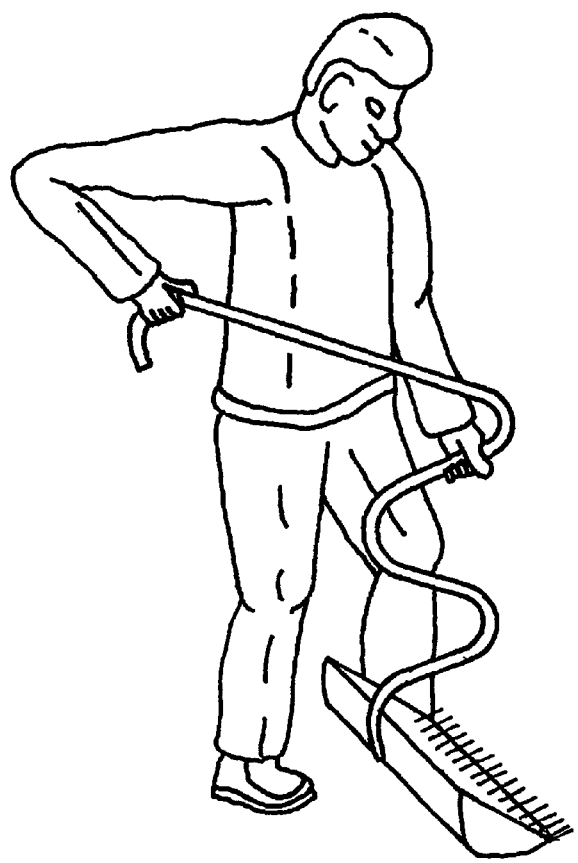
FIG. 22 is a representation in perspective of the manipulation of a fifth exemplary embodiment of the apparatus in accordance with the invention with a rake-and-scoop tool part (2), in a vertical operating position for collecting the entire mass of load material, e.g. the leaves, into the scoop as though with a shovel.

Having been loaded onto the tool, the material can then be transported in any direction, as though with a pitchfork (FIGS. 21, 22).

The prior-art devices do not allow these two kinds of work to be performed with a single tool.

Figure 23:
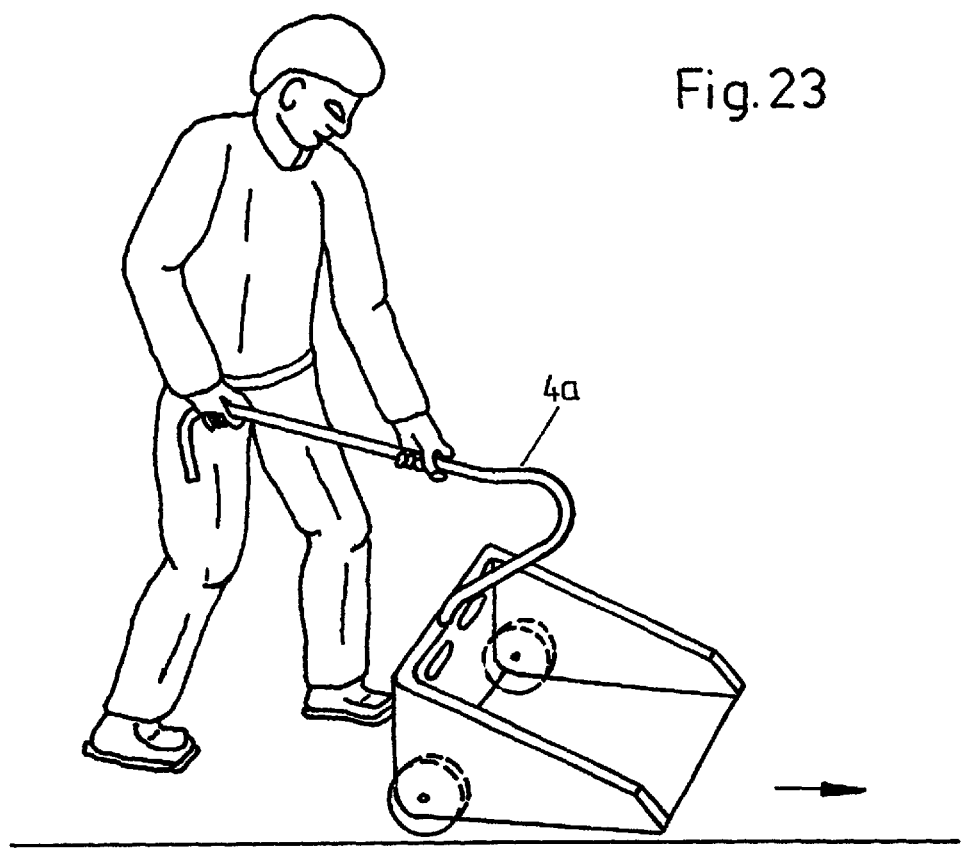
FIG. 23 is a representation in perspective of the manipulation of a sixth exemplary embodiment of the apparatus in accordance with the invention, which has as tool part (2) a shovel-shaped load container with rollers (12) on which to be pushed, shown in a vertical operating position for taking up the load material, e.g. snow, as though with a shovel; or for transporting the load as though with a cart.
Figure 24:
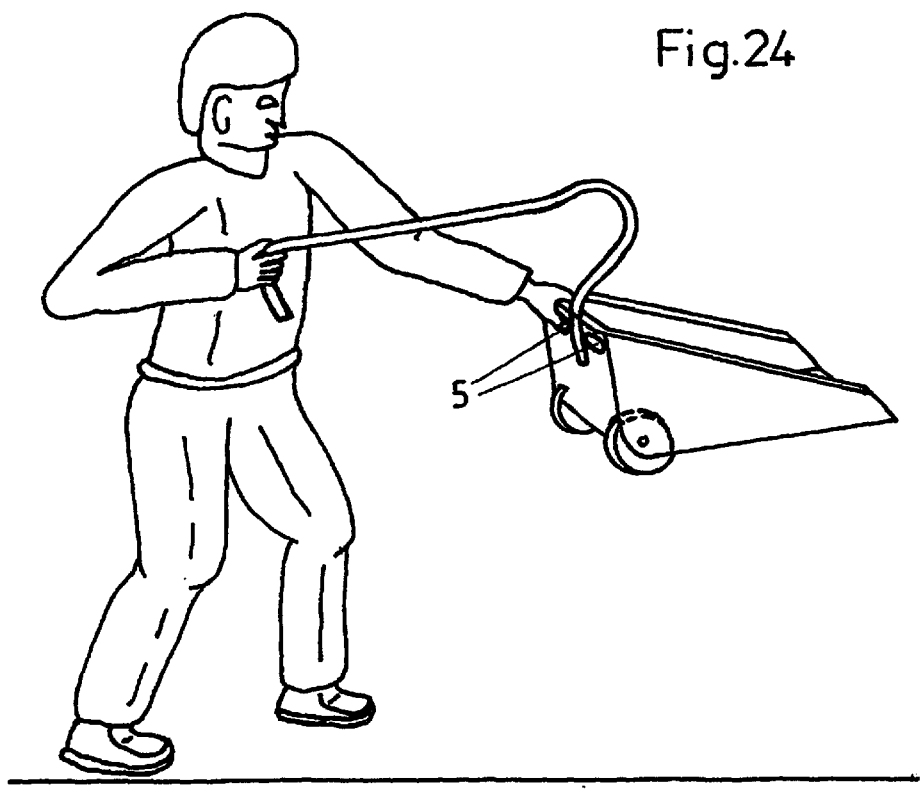
FIG. 24 is a representation in perspective of the manipulation of a sixth exemplary embodiment of the apparatus in accordance with the invention, which has as tool part (2) a shovel-shaped load container with rollers on which to be pushed, shown in an operating position in which the contained load, e.g. snow, can be propelled as though with a shovel. The front hand guides the apparatus at the lower grip area (5) of the S-shaped part of the handle (3), which is integrated into the edge of the shovel-shaped load container.

The apparatus in accordance with the present invention can advantageously be made suitable for transporting lightweight but voluminous loads by connecting the S-shaped part of the handle 3 to a particularly large "shovel/container" as tool part 2. Rollers are integrated into the shovel/container near its center of gravity at the back edge of the bottom, next to the sides. The front S-shaped handle region 5 is likewise integrated into the container, at its upper back edge. For this purpose the lower grip area is divided, spread out to the two sides and attached to the edge so as to be close to the center of gravity of the load. The apparatus in accordance with the invention can be rolled for relatively long distances, like a cart, or be slid horizontally along suitable elements. However, the load can also be lifted up as though with a shovel, and transported in that way. So as better to lift the large load in front of the body, the front grip area 4*a* is constructed as an intermediate section bent away from the straight handle part and is disposed almost horizontally above the tool part 2 (FIGS. 23, 24).

The apparatus in accordance with the invention is also advantageous for use with hand-operated machines. In the conventional hand-held power devices (e.g., hedge trimmer) the required force is applied or transmitted far away in front of the body, with both arms side by side; the effective levers are short. Some of the associated disadvantages have already been set forth above. The work of holding something up with both arms extended forward is strenuous at every height above hip level, as the center of gravity is always in front of the body. To hold things away from the body places a strain on the back, arms and hands and can even do damage. Not only does the longer force lever make a power device easier to guide when it is combined as the tool 2 with the handle 3 having an S-shaped section in accordance with the invention; the longer force lever moves the center of gravity closer to the body and allows the arms to be positioned in a more ergonomically favorable way.

Figure 28:
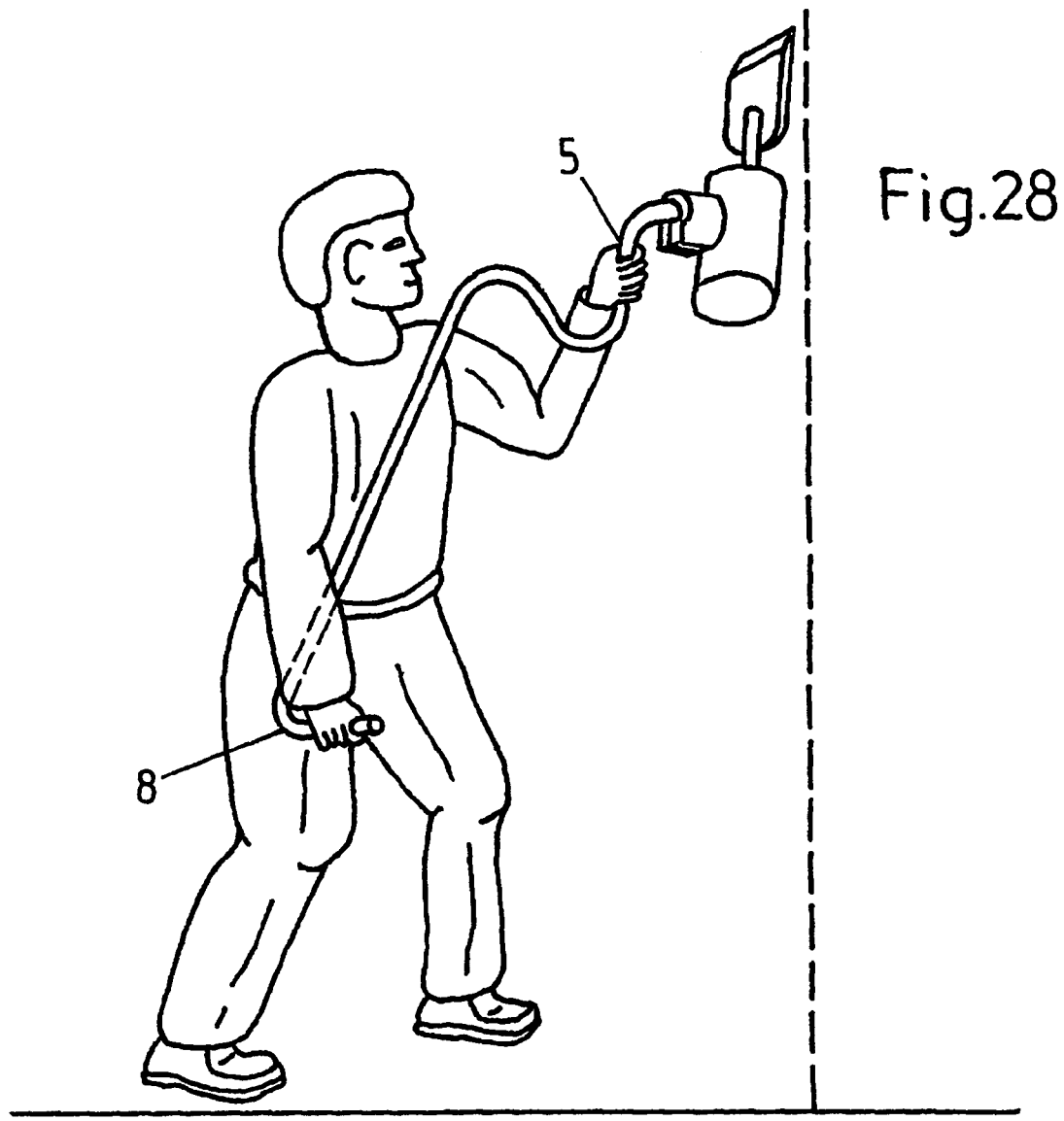
FIG. 28 is a representation in perspective of the manipulation of an eighth exemplary embodiment of the apparatus in accordance with the invention with power tool as tool part (2), in this case a compressed-air hammer, during the removal of plaster from a wall.

When a previously hand-held power device such as a compressed-air hammer is employed as the tool 2, equipped with a handle 3 having an S-shaped section in accordance with the invention, layers of concrete on floors or plaster on walls can be removed in an ergonomically favorable manner by an operator in a standing position (FIG. 28).

The multifunctionality is increased when previously hand-held power devices such as hedge trimmers are employed as the tool 2, equipped with a handle 3 having an S-shaped section in accordance with the invention. Such tools can then be used in more diverse ways, not only for trimming hedges. With the same tool dried-up shrubs can be cut off at ground level as though with a scythe, e.g. without bending over. The manipulation as a whole is facilitated; thus relatively high hedges can be trimmed without a ladder.

Figure 25A:
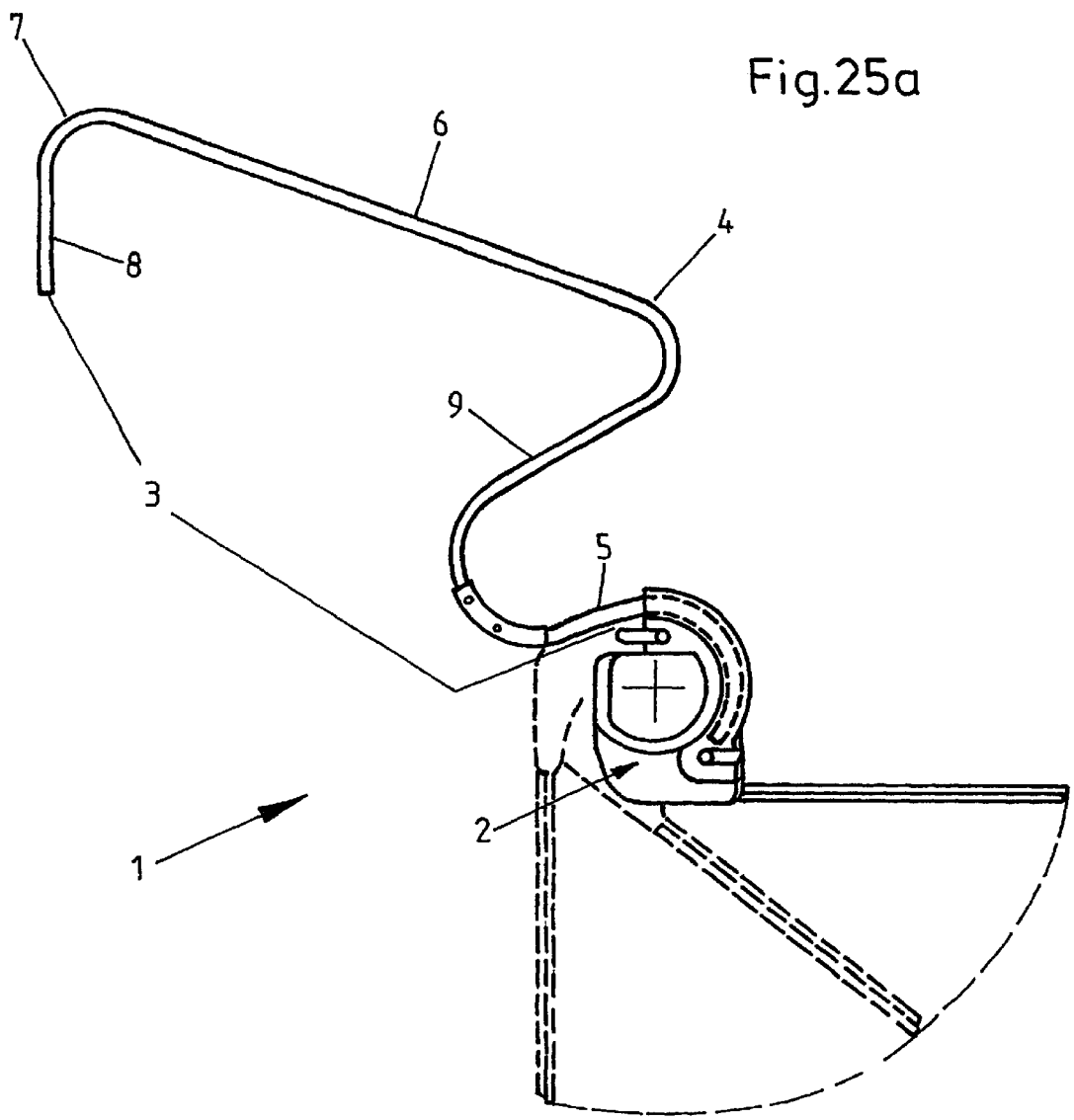
FIG. 25a shows a seventh exemplary embodiment of the apparatus in accordance with the invention, equipped with a power tool for trimming hedges, in vertical operating position as seen from the side.

For trimming hedges the operator usually holds the tool out to the side and moves it in an arc, whereas with the previously described devices in accordance with the invention the movement took place mainly in the direction of the plane of the handle. So that the lateral, chiefly vertical up-and-down movement employed with the apparatus in accordance with the invention can be favorably guided in the center of gravity near the tool part, the lower grip step of the S-shaped handle 3 is divided, forming grip areas on both sides. The bilateral grip areas can, as shown in FIG. 25*a* and *b*, be movably or displaceably connected as part of the handle to the tool 2, consisting of the power-driven device. Alternatively, the lower grip area of the S-shaped handle 3 can be formed by individual grip parts that are fastened to the housing of the power device. The lower grip area in the S-shaped region can even be formed from the housing itself, in order to provide an optimal and economical guidance grip with a switch function.

Another advantage of using the handle-lever arrangement in accordance with the invention with power tools is that the cable for the electricity supply enters the handle at its back end, a long distance away from the cutting work, so that accidental cutting of the cable is avoided.

Figure 25B:
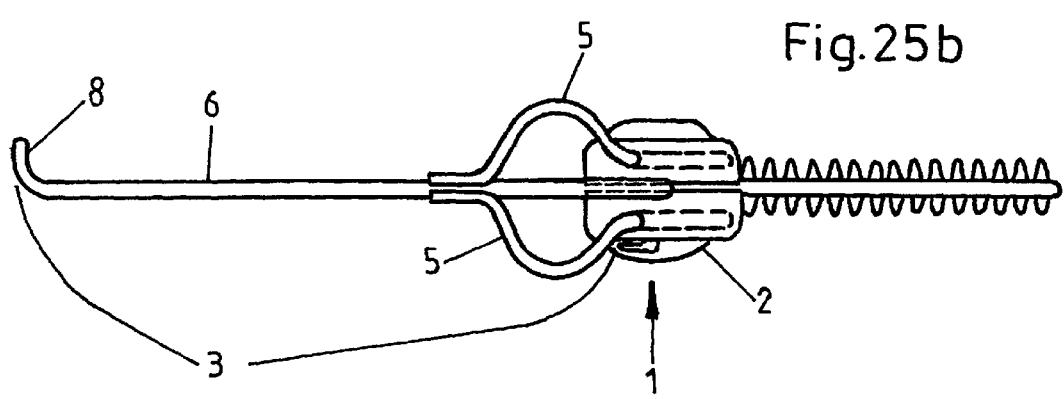
FIG. 25b shows a seventh exemplary embodiment of the apparatus in accordance with the invention, equipped with a power tool for trimming hedges, in plan view from above.
Figure 26:
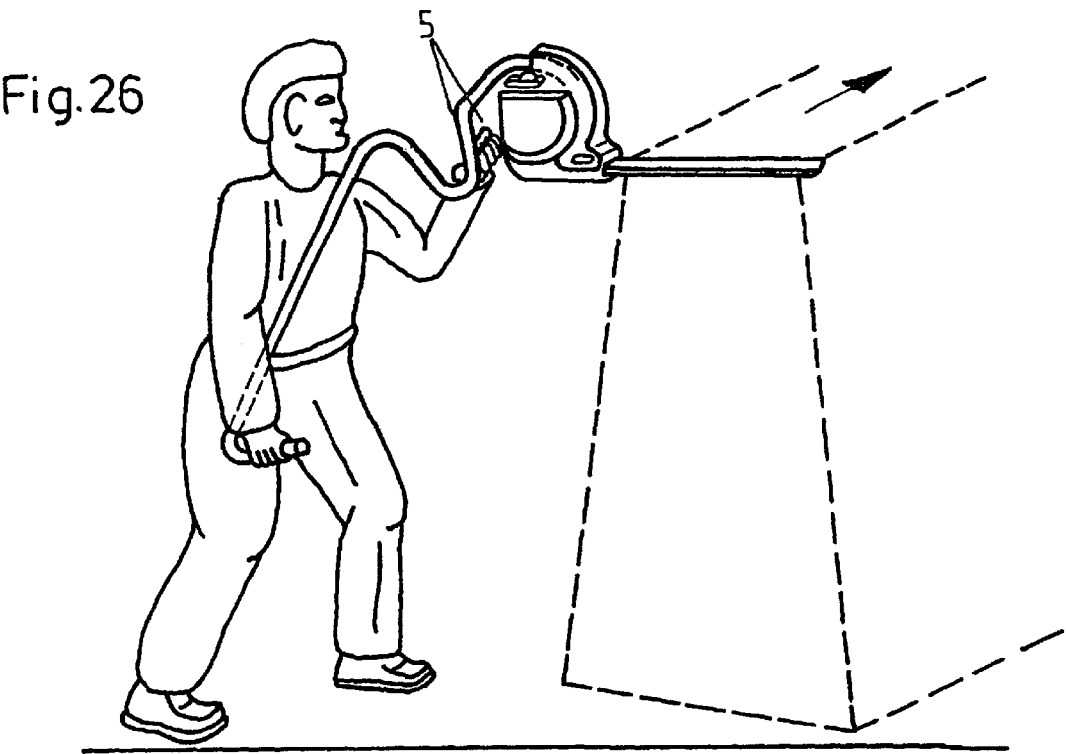
Figure 27:
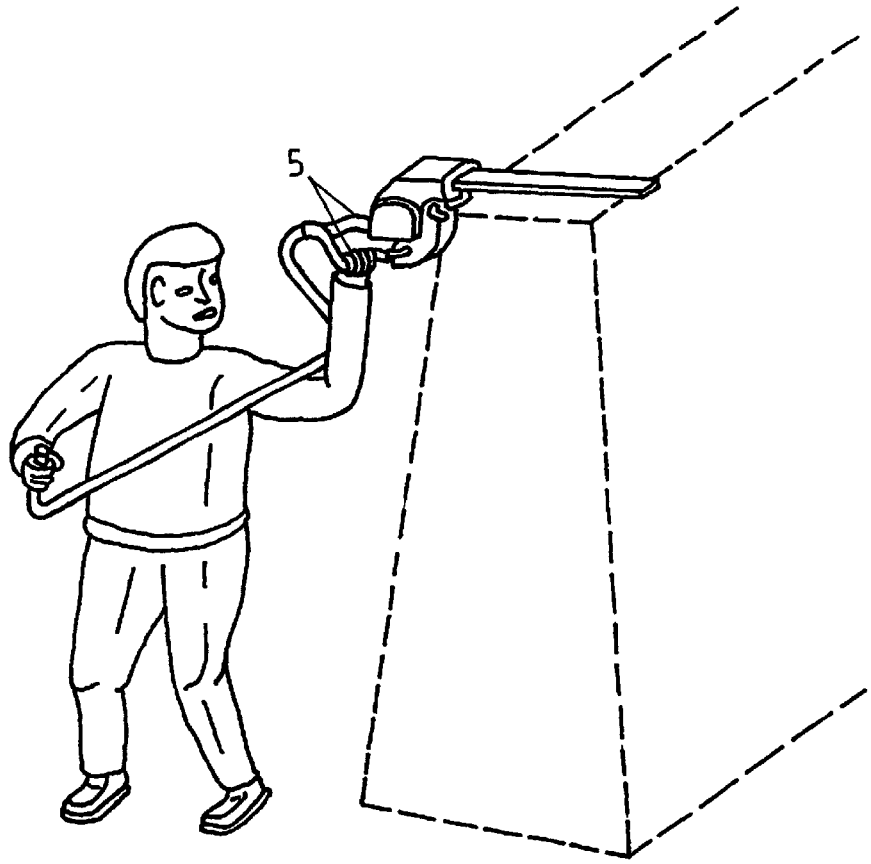
FIG. 27 is a representation in perspective of the manipulation of a seventh exemplary embodiment of the apparatus in accordance with the invention, with power tool turned over during hedge trimming.

By altering the angle of the power tool by 90°, the weight of the tool can be supported in an ergonomically favorable manner, by holding the back handle region 7 with the arm extended downward when the top of a hedge is being cut horizontally to a height of 1.50–1.80 m without a ladder (FIG. 26). It is also possible to cut above this height: a man 1.80 m tall can cut the hedge at a height up to 2.3 m without a ladder by turning the power tool upward, bracing the front end of the handle against his shoulder and guiding the tool by means of the end grip 8, which now points upward. The movement of the hedge trimmer in accordance with the invention is mainly sideways; to facilitate the guidance of such a movement, the back end grip 8 is disposed at an angle of ca. 10° to the plane of the major force directions. The position of this region on the left side, as shown in FIG. 25, is rarely needed since most people are right-handed. In most cases the end grip 8 will be disposed so as to extend away from the body toward the right.

Figure 29:
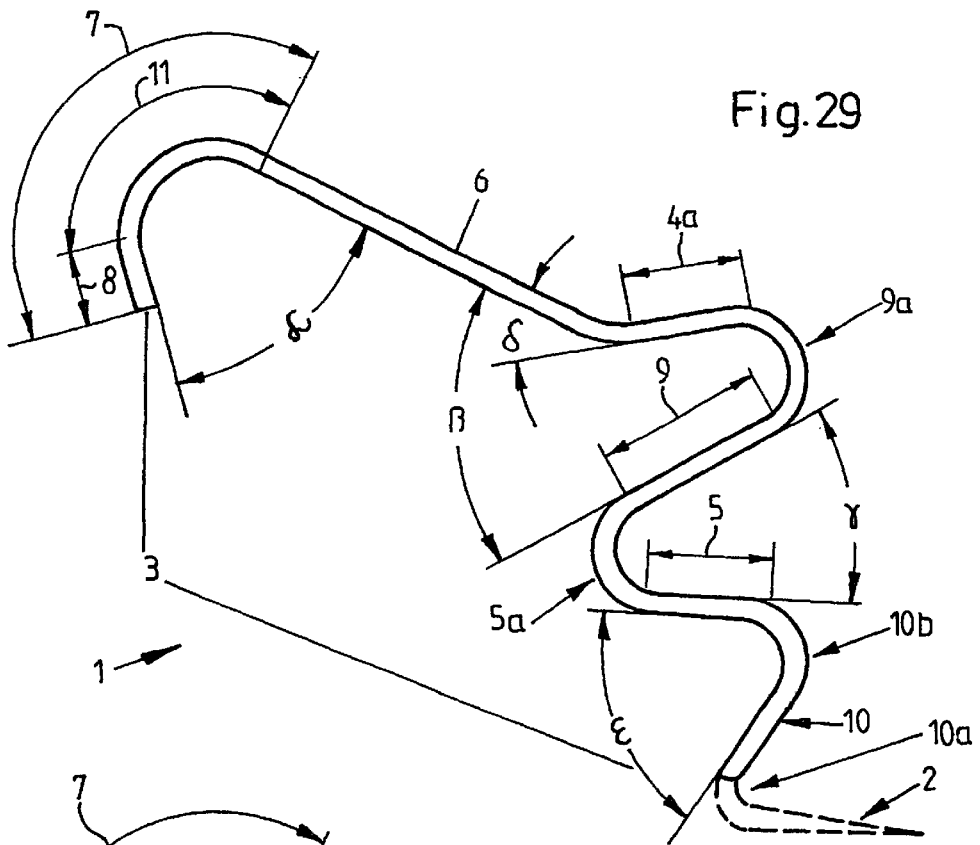
FIG. 29 shows an embodiment with an intermediate section set at an angle with respect to the straight middle section.

FIG. 29 shows an embodiment of the invention according to claim 9, in which an intermediate section 4*a* is disposed at an angle $\delta$ of about 45° with respect to a straight middle section 6. If the angle $\beta$ (between the first straight grip area 9 and the straight middle section 6) is kept at about 55°, as in the embodiment according to FIG. 1, the first curved section 9*a* then extends over a larger range of angles.

Figure 30:
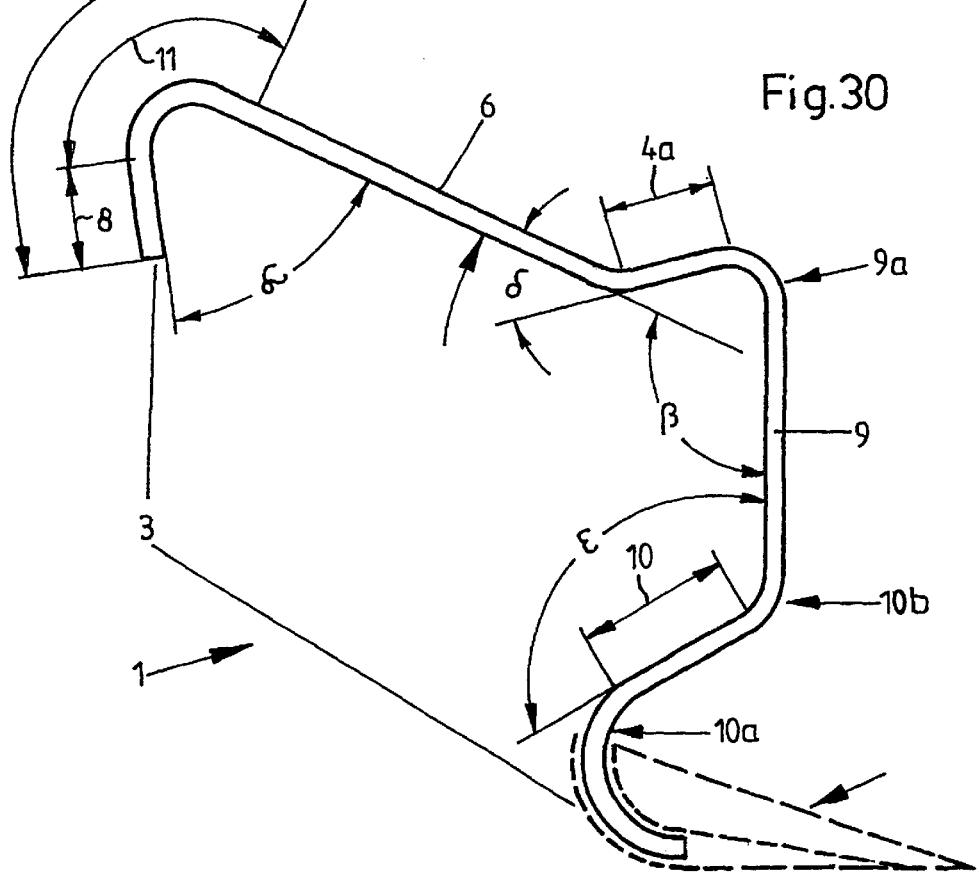
FIG. 30 shows another embodiment of the invention.

FIG. 30 shows an alternative embodiment of the invention according to claim 16, in which the first straight grip area 9 is tilted not toward the middle section 6 but rather away from the latter, at an angle $\beta$ of about 115°. A tread area 10 adjacent to a transitional section 10 is tilted toward the straight middle section 6, being disposed at an angle $\epsilon$ of about 120° to the grip area 9. Joined to the tread area 10 is the fixing end section 10*a*, which can be curved away from the middle section 6 as shown in FIG. 30.

List of Reference Numerals

2 Tool part
3 Work handle
4 Grip area of handle
4*a* Angled intermediate section
5 Front lower grip area
6 Straight handle region
7 Back handle region
8 Straight end grip
9 First straight grip area
9*a* First curved section
10 Tread area
10*a* Fixing end section
10*b* Transitional section
11 Curved section
12 Rollers
13 Side grip
14 Transport apparatus
15 Engagement

What is claimed is:

1. Handle for a tool with a curved handle end section, a straight middle section and a fixing end section for attaching the tool, wherein between the straight middle section and the fixing end section is disposed a grip section curved in an S shape, which comprises a first straight grip area that is connected to the middle section by a first curved section and is set at a first angle of about 30° to about 90°, with respect to the middle section, and a second straight grip area that is connected to the first straight grip area by a second curved section and is set at a second angle of about 30° to about 60°, with respect to the first straight grip area, the fixing end section being connected to the second grip area.

2. Handle according to claim 1, wherein the first angle is about 55°.

3. Handle according to claim 1, wherein the second angle is about 45°.

4. Handle according to claim 1, wherein between the second straight grip area and the fixing end section is disposed a curved transitional section, a direction of curvature of which is a same as that of the first curved section.

5. Handle according to claim 4, wherein between the curved transitional section and the fixing end section is disposed a straight tread area.

6. Handle according to claim 5, wherein at least one of the transitional section and the tread area is set at an angle of about 40° to about 90°, with respect to the second straight grip area.

7. Handle according to claim 1, wherein the handle end section is continuous with a straight end grip.

8. Handle according to claim 1, wherein at least one of the handle end section and the end grip is set at an angle of about 30° to about 90°, with respect to the middle section.

9. Handle according to claim 1, wherein the curved handle end section, the first and second curved sections, and the transitional section are curved in a form of an arc of a circle.

10. Handle according to claim 1, wherein a length of the handle end section and of the grip areas corresponds to at least about a width of a hand.

11. Handle according to claim 1, wherein between the first curved section and the straight middle section is a slanted intermediate section.

12. Handle according to claim 11, wherein the slanted intermediate section is set at an angle of about 45° with respect to the straight middle section.

13. Handle according to claim 12, wherein the first angle is about 115°.

14. Handle according to claim 1, wherein a grip element is attached to at least one of the grip areas, the curved sections, the handle end section, and the tread area.

15. Handle according to claim 14, wherein the grip element can be adjusted in at least one of its position and direction.

16. Handle according to claim 1, wherein the handle extends substantially in one plane.

17. Handle according to claim 1, wherein at least one of the grip areas, the handle end section, the end grip, and the tread area is set at an angle in three-dimensional space.

18. Apparatus with a tool and a handle according to claim 1.

19. Apparatus according to claim 18, wherein the handle is fixed off-center to a tool.

20. Handle according to claim 19, wherein the first straight grip area is of about a same length as the straight middle section.

21. Handle for a tool with a curved handle end section, a straight middle section, and a fixing end section for attaching the tool, wherein between the straight middle section and the fixing end section is disposed a grip section curved in substantially an S shape, which comprises a first straight grip area that is connected to the middle section by an intermediate section set at a first angle with respect to the middle section and a first curved section, that is set at a second angle of about 90° to 130° with respect to the middle section, such that the first straight grip area, is connected to a straight tread area by a curved transitional section, is the straight tread area being set at an angle of about 120° with respect to the first straight grip area, and the second and third angles being located on a same side of the handle.

* * * * *